United States Patent [19]

Pejsa

[11] Patent Number: 4,577,977
[45] Date of Patent: Mar. 25, 1986

[54] ENERGY SUBMETERING SYSTEM
[75] Inventor: Jane H. Pejsa, Minneapolis, Minn.
[73] Assignee: Honeywell Inc., Minneapolis, Minn.
[21] Appl. No.: 718,146
[22] Filed: Apr. 1, 1985
[51] Int. Cl.⁴ .............................................. G01K 17/08
[52] U.S. Cl. ........................................ 374/39; 236/94;
62/125; 165/11.1; 374/41
[58] Field of Search ........................... 374/39, 40, 41;
65/11 R; 236/94; 62/125; 377/25

[56] References Cited
U.S. PATENT DOCUMENTS

| 4,002,890 | 1/1977 | Welin | 364/557 |
| 4,234,927 | 11/1980 | First | 165/11 R |
| 4,437,771 | 3/1984 | Cazzaniga | 374/39 |
| 4,455,095 | 6/1984 | Bleiler | 374/39 |
| 4,459,041 | 7/1984 | Knauss et al. | 374/39 |

FOREIGN PATENT DOCUMENTS

| 2362379 | 3/1978 | France | 165/11 R |
| 2395495 | 2/1979 | France | 377/25 |
| 3110393 | 10/1982 | Netherlands | 374/39 |

Primary Examiner—Robert I. Smith
Assistant Examiner—Thomas B. Will
Attorney, Agent, or Firm—Charles G. Mersereau

[57] ABSTRACT

A system for submetering artificial energy consumption in a multi-user environment in which a single central system source services the several separate users by means of individual space conditioning subsystems is disclosed which enables accurate proportioning of subsystem energy consumption by monitoring the time intervals of the OFF/ON status of each individual space conditioning subsystem along with the temperature of the conditioned space and utilizes the monitored time intervals and temperature in conjunction with the relative heat capacity of each individual conditioned space to determine the heat consumption of each subsystem relative to all the subsystems served by the central source.

5 Claims, 2 Drawing Figures

ENERGY SUBMETERING SYSTEM

BACKGROUND OF THE INVENTION

Field of the Invention

The field of the invention relates generally to the field of energy usage metering and, more particularly, to a submetering system for multi-tenant or multi-owned buildings having individual space conditioning subsystems.

CROSS-REFERENCE TO RELATED APPLICATION

Reference is made to a related application Ser. No. 718,147 of J. H. Pejsa, the inventor in the present application, and T. H. Holland filed of even date and assigned to the same assignee as the present application. By that invention energy consumption is submetered for constant flow systems by monitoring the ON/OFF status of each individual space conditioning subsystem, monitoring the temperature differential across each separate heat exchanger, and utilizing the monitored ON time and the temperature differentials in conjunction with the relative heat capacity of the measured fluid to determine the heat or coolant consumption of each such subsystem relative to all such units.

In the present invention, on the other hand, submetering is accomplished by monitoring the time intervals of the OFF/ON status of each individual space conditioning subsystem along with the temperature of the conditioned space and utilizing the monitored time intervals and temperature in conjunction with the relative heat capacity of each individual conditioned space to determine the heat consumption of each subsystem relative to all the subsystems served by the central source.

DESCRIPTION OF THE PRIOR ART

It has been customary to artificially heat and cool multi-tenant or multi-owned buildings such as apartments, office buildings and condominiums by employing large central systems to serve a plurality of separately leased areas. In this manner the central system supplies heating or cooling energy in the form of steam or hot or chilled water to individual heat exchangers or space conditioning subsystems located in each rental unit. This approach is quite efficient from the standpoint of heating or cooling the entire building. The cost is, in turn, normally borne by the renters or owners as part of general building overhead apportioned without reference to actual energy use as by using unit square footage as a basis.

This approach has several serious drawbacks, however. It may be inherently unfair. For example, location has been found to have a significant impact on annual average heating loads. In a cold climate, a north facing apartment may require three to four times as much heating energy as one of equal square footage facing south. In addition, with such an approach there is very little incentive for conservation by individual tenants because those who conserve still share the cost with those who waste. As energy costs, in general, continue to rise, the need for conservation is becoming greater and the concern of landlords, tenants and utility companies is increasing. This has produced a need for a system that is both fair and one which encourages conservation.

One concept which provides incentives which lead to both lower overall usage and lower individual consumption is that of using direct individual consumption monitors or submetering systems. Several such systems exist for use with central steam or hot water heating systems, for example. They are conventional liquid flow meters together with temperature sensors to measure actual energy supplied to individual rental units. However, such devices are quite expensive and require piping and other changes which entail substantial installation costs, particularly in the retrofit environment.

The scope of the problem is large. It has been estimated that there are more than ten million residential units alone in buildings served by central steam or hot water systems and this number is likely to grow in the next few years. It is apparent that a definite need exists for a low-cost, relatively accurate system for submetering energy consumption.

SUMMARY OF THE INVENTION

By means of the present invention, there is provided a low-cost submetering system for hot or chilled water space-conditioning systems which monitors a plurality of individual energy delivery space-conditioning systems and which readily lends itself to retrofitting existing structures. The present invention measures energy consumption by monitoring the state of each individual energy delivery subsystem, i.e., the "OFF/ON" status and the temperature of the conditioned space.

The system includes a central receiving and monitoring station which includes a master transceiving unit having calculating, data storage and display capabilities. Remote transceiver or store units are located at each submetered space-conditioning subsystem. These units transmit signals, normally converted to digital form by an analog to digital (A/D) converter, related to OFF/ON state and temperature data in response to interrogation by the master unit at desired time intervals ($\Delta t$). Communication between units may be by any convenient mode such as 2-way power line carrier, telephone line, radio signal or direct connection.

In operation, at each preselected $\Delta t$, normally every few seconds, every remote unit is sequentially interrogated by the master unit over a communication channel as by 2-way powerline carrier. If the energy delivery system is ON, the remote unit responds with digital signals representing the ON state and the temperature and the temperature of the conditioned space. The master unit accumulates and integrates these data individually for each submetered unit and thereby monitors the fraction of the energy consumption of all units attributable to that unit according to the equation:

$$F_j = S_j / \sum_{1}^{N} S_n$$

where $F_j$ represents the fractional energy usage of a subsystem of interest, and $S_j$ represents the relative energy usage for any particular unit out of N units. This equation is developed in detail below. Of course, by factoring the appropriate conversion factor into the equation, energy share can be computed as a proportion or as a customer cost in dollars rather than as Q or energy usage. A permanent record may also be kept if desired.

This method of submetering energy consumed in mastermetered buildings, while still an approximation, comes close to the accuracy of conventional BTU meters or calorimeters and by eliminating the need for direct measurement of flow, this method is significantly less costly.

DESCRIPTION OF THE PREFERRED EMBODIMENT

Figure 1:
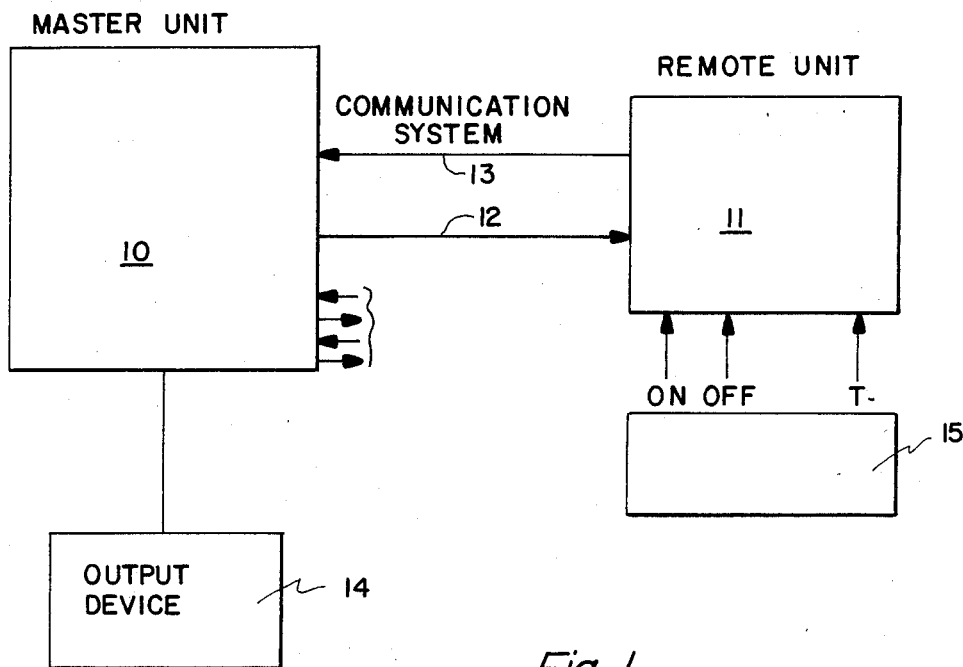
FIG. 1 is a block diagram of one embodiment of the invention.

FIG. 1 depicts a block diagram of a typical submetering system utilizing the invention. This includes a master unit 10 in 2-way communication with a plurality of remote units 11 as illustrated by lines 12 and 13. The master unit 10 is also connected to an output device illustrated at 14. The master unit is one which is capable of continuously calculating consumption or energy usage and integrating such usage over a period of time for each remote unit served. The master unit is normally programmed to interrogate each remote unit on a continuous basis at preselected intervals. Such a device is normally microprocessor controlled and units which will perform the task are readily available on the market and can be programmed as necessary to the invention by one possessed of ordinary skill in the art.

Each remote unit 11 is designed to measure and transmit the temperature of the conditioned space and the ON or OFF status of the space conditioning subsystem upon interrogation by the master unit 10. These parameters may be sensed directly from a thermostat 15.

Figure 2:
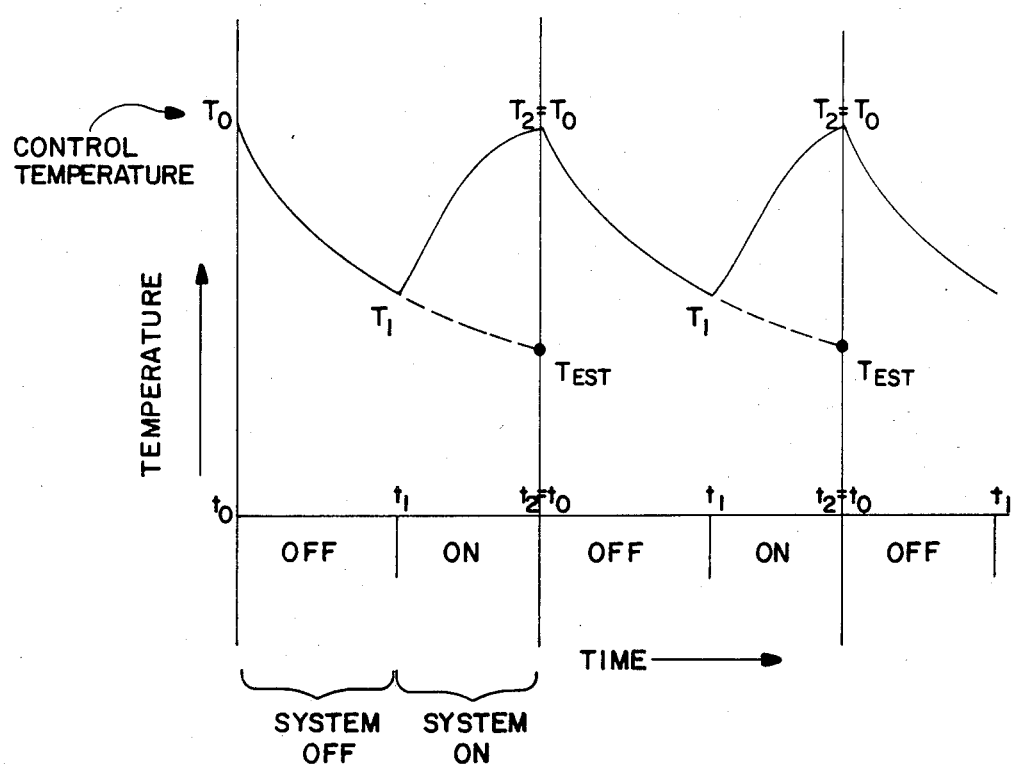
FIG. 2 is a graph of a typical time vs. temperature cyclical relationship for heating a conditioned space.

FIG. 2 is a graphical representation of typical cyclical temperature versus time curve for a conditional space served by an individual space-conditioning subsystem during the heating season. The cycle starts with the endpoint of the "ON" portion of the cycle at which time ($t_0$) to the temperature of the conditioned space is at the desired set point control temperature ($T_0$). This, of course may include any override if such undesirable characteristic be inherently present in the operation of the thermostatic control device used. During the initial time interval or OFF cycle, $t_0$ to $t_1$, the temperature decays at an exponential rate related to the heat loss characteristic to such a system when make-up or replacement heat is zero. At time $t_1$ the temperature of the conditioned space has fallen to a value $T_1$ and the thermostatic control device causes the space-conditioning subsystem to switch again to the ON mode. The space-conditioning subsystem remains in the ON mode until the space temperature again is equal to the set point temperature, i.e., $T_2 = T_0$ which occurs in the time interval $t_1$ to $t_2$ which becomes $t_0$ for the next cycle and the process repeats.

The temperature decay during the OFF interval of the cycle can be represented by the well-known relationship $$T = a e^{b \cdot \Delta t} \quad (1)$$

where T is the absolute temperature, $\Delta t$ is the decay time interval and a and b are constants which will now be developed with reference to FIG. 2.

It is readily seen that at $T = T_0$, $\Delta t = t_0 - t_0 = 0$ and at $T = T_1 \Delta t = t_1 - t_0$. Thus, at $t_0$, $T = a = T_0$ and $$T = T_0 e^{b \Delta t} \quad (2)$$

Since at $t_1$, $T = T_1$, $$T_1 = T_0 e^{b(t_1 - t_0)} \quad (3)$$

and $$\ln\left[\frac{T_1}{T_0}\right] = b(t_1 - t_0)$$

or $$b = \ln\left[\frac{T_1}{T_0}\right] \cdot \frac{1}{t_1 - t_0}$$

and, substituting in equation 2, we have at any time t;

$$T = T_0 e^{\ln \frac{T_1}{T_0} \cdot \frac{t - t_0}{t_1 - t_0}} \quad (4)$$

or $$T = T_0 \left[\frac{T_1}{T_0}\right]^{\left(\frac{t - t_0}{t_1 - t_0}\right)} \quad (5)$$

The dashed lines for each cycle of FIG. 2 represent the continuation of the temperature decay to time $t = t_2$ which can be expressed as $$T_{est} = T_0 \left[\frac{T_1}{T_0}\right]^{\left(\frac{t_2 - t_0}{t_1 - t_0}\right)} \quad (6)$$

where $T_{est}$ is the theoretical or estimated temperature at time $t_2$ were there no heat added by the space conditioning subsystem.

The total energy delivered to the space-conditioning subsystem during an OFF/ON cycle can be given by $$Q = \overline{MC}(T_2 - T_{est}) \quad (7)$$

or $$Q = \overline{MC}\left(T_2 - T_0\left[\frac{T_1}{T_0}\right]^{\left(\frac{t_2 - t_0}{t_1 - t_0}\right)}\right)$$

where $\overline{MC}$ is the relative heat capacity of the submetered conditioned space. It has been found that the area of the conditioned space is proportioned to the heat capacity of that space in a particular building environment. It thus becomes a good way to allocate the constant MC such that for a rental space $S_j$ $$Q_j \alpha S_j = area_j\left(T_2 - T_0\left[\frac{T_1}{T_0}\right]^{\left(\frac{t_2 - t_0}{t_1 - t_0}\right)}\right) \quad (8)$$

and the proportion of the energy used for all rental space because $$F_j = S_j / \sum_1^N S_n \tag{9}$$

In this manner the amount of energy required to heat or cool a particular submetered conditioned space unit can be apportioned with surprising accuracy.

Each remote unit may be connected so that it senses both the ON/OFF states of the space conditioning subsystem and the temperature of the conditioned space by connection to the thermostatic device which controls that space. This requires only a connection to sense the status of the thermostat switch and a simple temperature sensor which in some applications may be the thermostat temperature sensor itself. For most applications, each remote unit contains a conventional analog to digital conversion system to convert the data assimilated to digital form for transmission to the master unit.

In the normal set-up any particular application will involve a plurality of the remote units 11 coordinated by and in communication with a master unit 10. This give the system the ability to continually monitor energy usage by a relatively large number of units in a large building or complex.

In operation, the master unit will interrogate each of the remote units on a predetermined time basis such as at an interval of every few seconds depending on the number of units required to be addressed. It will then receive status and temperature data from each of the units. Any type of output means desired could be used to display energy usage, print billings, store data for future reference or other use.

The embodiments of the invention in which an exclusive property or right is claimed are defined as follows:

1. A method for submetering artificial energy consumption in a multi-user environment in which a central source services a plurality of individual users by means of individual space conditioning subsystems comprising the steps of:
    monitoring the time interval of the OFF segment and the time interval of the entire OFF/ON cycle for each cycle of each individual space conditioning subsystem;
    monitoring the temperature of each conditioned space to determine temperature decay function during the OFF segment and the actual space temperature at the conclusion of each OFF/ON cycle for each cycle of each individual space conditioning means;
    determining the total artificial heating or cooling energy supplied by each such individual space conditioning subsystem during each complete OFF/ON cycle according to the relationship $$Q = \overline{MC}(T_2 - T_{est})$$

wherein:
Q is the artificial heating or cooling energy;
$\overline{MC}$ is the relative heat capacity of the conditioned space;
$T_2$ is the conditioned space temperature at the conclusion of the ON segment of the control cycle; and
$T_{est}$ is the theoretical extrapolated decay temperature at the end of the complete OFF/ON cycle;
and utilizing the total artificial energy supplied by each individual space conditioning subsystem to determine the heat consumption of each such subsystem relative to all such subsystems served by said central source as a fraction of the total thereof.

2. A method according to claim 1 wherein the theoretical decay temperature $T_{est}$ is given by $$T_{est} = T_0 \left[ \frac{T_1}{T_0} \right]^{\left(\frac{t_2 - t_0}{t_1 - t_0}\right)}$$

wherein:
$T_0$ is the conditioned space temperature at the beginning of the OFF segment of the control cycle;
$T_1$ is the conditioned space temperature at the end of the OFF segment of the control cycle;
$t_0$ is the time at $T_0$;
$t_1$ is the time at T, and
$t_2$ is the time of the complete OFF/ON control cycle.

3. The method of claim 1 wherein said relative heat capacity $\overline{MC}$ is a factor based on the area of said individual conditioned space.

4. The method of claim 3 wherein said relative heat capacity $\overline{MC}$ is a factor based on the area of said individual conditioned space.

5. A system for submetering artificial energy consumption in a multi-user environment in which a central source services a plurality of individual users by means of individual space conditioning subsystems comprising:
    a plurality of remote monitoring units, one associated with each said space conditioning subsystem further comprising
        means for monitoring the time interval of the OFF/ON status of each individual space conditioning subsystem;
        means for monitoring the temperature of the conditioned space;
    master control means for interrogating each of said plurality of remote monitoring units receiving information therefrom, storing and processing said information and producing an output relative to the energy consumption thereof;
    2-way communication means for enabling communication between said master control units and said remote units; and
    output means in communication with said master control means for reproducing an output relative to said energy usage.

* * * * *